(12) United States Patent
Kondo et al.

(10) Patent No.: US 7,440,596 B2
(45) Date of Patent: Oct. 21, 2008

(54) IMAGE VERIFICATION SYSTEM AND METHOD USING RESIDUAL FINGERPRINT DETECTION

(75) Inventors: Satoru Kondo, Kanagawa (JP); Keiichi Shinozaki, Kanagawa (JP)

(73) Assignee: Sony Corporation (JP)

( * ) Notice: Subject to any disclaimer, the term of this patent is extended or adjusted under 35 U.S.C. 154(b) by 633 days.

(21) Appl. No.: 10/859,291

(22) Filed: Jun. 3, 2004

(65) Prior Publication Data

US 2004/0252869 A1 Dec. 16, 2004

(30) Foreign Application Priority Data

Jun. 13, 2003 (JP) ............................ P2003-169535

(51) Int. Cl.
  *G06K 9/00* (2006.01)
  *G06K 9/62* (2006.01)
  *G06K 9/74* (2006.01)
  *B42D 15/00* (2006.01)

(52) U.S. Cl. .......................... 382/124; 382/209; 283/68; 356/71

(58) Field of Classification Search ......... 382/124–125, 382/115, 128–132, 141, 159–160, 181, 203, 382/206, 209, 218; 283/68–70; 356/71
See application file for complete search history.

(56) References Cited

U.S. PATENT DOCUMENTS

| | | | | |
|---|---|---|---|---|
| 3,917,402 A | * | 11/1975 | Ohta | ............................ 356/71 |
| 5,890,808 A | * | 4/1999 | Neff et al. | .................... 382/209 |
| 6,535,622 B1 | | 3/2003 | Russo et al. | |
| 6,707,934 B1 | * | 3/2004 | Takeda et al. | ................ 382/124 |
| 7,035,441 B2 | * | 4/2006 | Bergenek et al. | ............. 382/124 |
| 2002/0028004 A1 | * | 3/2002 | Miura et al. | ................. 382/124 |
| 2002/0050713 A1 | | 5/2002 | Bergenek et al. | |
| 2003/0202687 A1 | * | 10/2003 | Hamid et al. | ................ 382/124 |

FOREIGN PATENT DOCUMENTS

| | | |
|---|---|---|
| JP | 04-199375 | 7/1992 |
| JP | 6-162175 | 6/1994 |
| JP | 08-287259 | 11/1996 |
| JP | 10-214343 | 8/1998 |
| JP | 2002-259345 | 9/2002 |

OTHER PUBLICATIONS

EPO Search Report mailed Sep. 6, 2005.

* cited by examiner

*Primary Examiner*—Jingge Wu
*Assistant Examiner*—Manav Seth
(74) *Attorney, Agent, or Firm*—Rader Fishman & Grauer PLLC; Ronald P. Kananen

(57) ABSTRACT

An image verification system including a fingerprint sensing means for sensing a fingerprint; an image data storing means for storing image data of the fingerprint sensed by the fingerprint sensing means as first image data; and a residual fingerprint judging means for comparing second image data of a fingerprint newly sensed by the fingerprint sensing means with the first image data stored by the image data storing means, and judging whether or not the second image data indicates a residual fingerprint, wherein the residual fingerprint judging means judges that the second image data indicates a residual fingerprint and does not verify the fingerprint when said first image data and the second image data match, while judges that the second image data is not a residual fingerprint and verifies the fingerprint when the first image data and the second image data do not match, whereby a fingerprint can be verified with a high precision without erroneously detecting a residual fingerprint.

18 Claims, 16 Drawing Sheets

FIG. 16

| | d_fpr | dd | |
|---|---|---|---|
| d_fprA | FINGERPRINT DATA OF SUBJECT A | X COORDINATE | Y COORDINATE | ddA
| d_fprB | FINGERPRINT DATA OF SUBJECT B | X COORDINATE | Y COORDINATE | ddB
| d_fprC | FINGERPRINT DATA OF SUBJECT C | X COORDINATE | Y COORDINATE | ddC
| d_fprD | FINGERPRINT DATA OF SUBJECT D | X COORDINATE | Y COORDINATE | ddD
| ⋮ | ⋮ | ⋮ | ⋮ |
| d_fprN | FINGERPRINT DATA OF N | X COORDINATE | Y COORDINATE | ddN

| | | X COORDINATE | Y COORDINATE |
|---|---|---|---|
| d_fprA1 — | FINGERPRINT DATA (1) OF FOREFINGER OF SUBJECT A | X COORDINATE — ddA1 | Y COORDINATE |
| d_fprA2 — | FINGERPRINT DATA (2) OF FOREFINGER OF SUBJECT A | X COORDINATE — ddA2 | Y COORDINATE |
| d_fprA3 — | FINGERPRINT DATA (3) OF FOREFINGER OF SUBJECT A | X COORDINATE — ddA3 | Y COORDINATE |
| d_fprB1 — | FINGERPRINT DATA (1) OF FOREFINGER OF SUBJECT B | X COORDINATE — ddB1 | Y COORDINATE | dd = {X COORDINATE, Y COORDINATE}

14

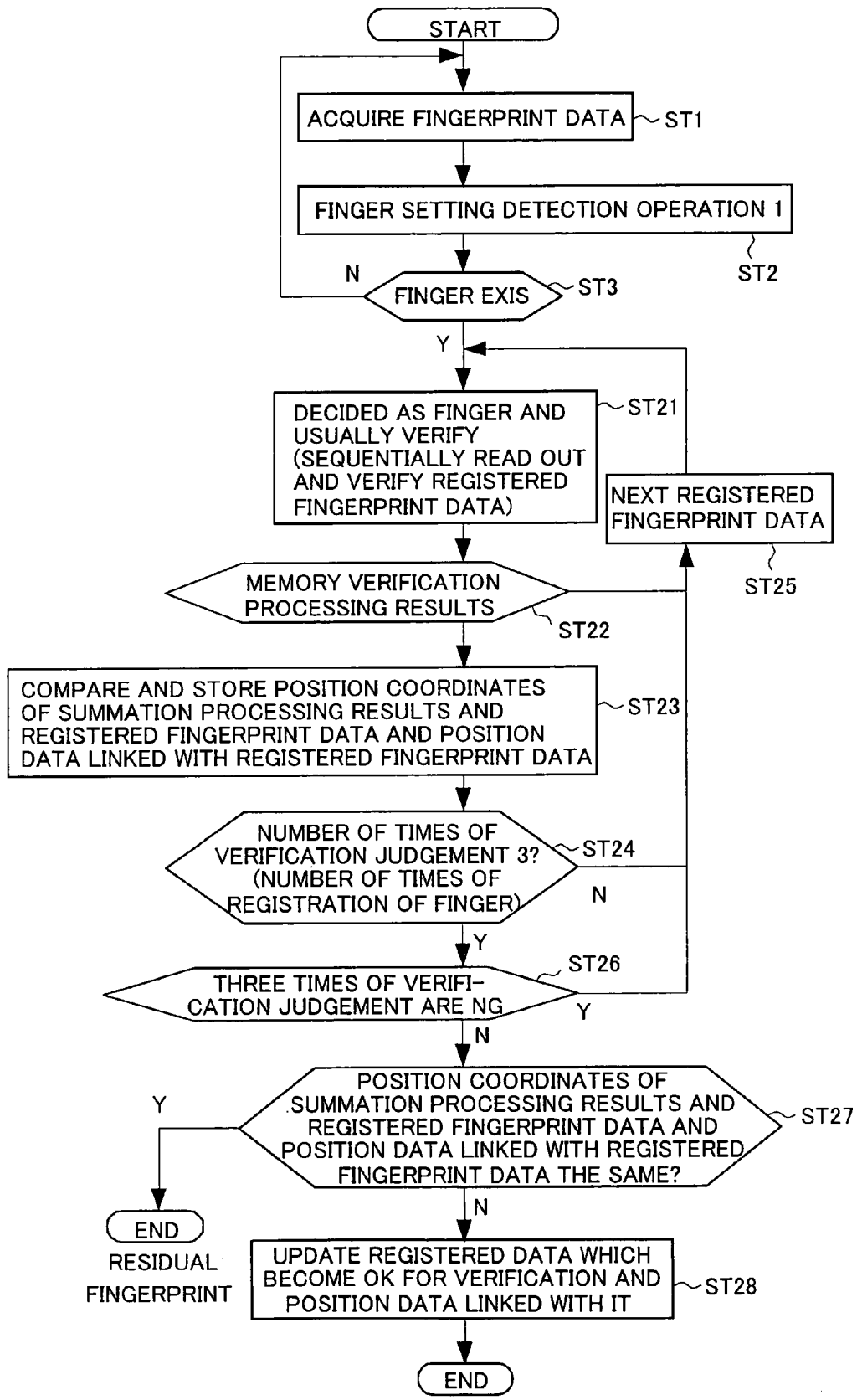

US 7,440,596 B2

IMAGE VERIFICATION SYSTEM AND METHOD USING RESIDUAL FINGERPRINT DETECTION

BACKGROUND OF THE INVENTION

1. Field of the Invention

The present invention relates to an image verification system and an image verification method for verifying image data obtained by sensing, for example, a fingerprint.

2. Description of the Related Art

A fingerprint verification system for sensing the fingerprint and verifying the subject based on the image data according to the sensed fingerprint has been known (for example Japanese Unexamined Patent Publication No. 10-214343). For example, in a general fingerprint verification system, the finger is fixed on a sensor unit to sense the fingerprint and generate the image data.

Summarizing the problem to be solved by the invention, in a fingerprint verification system, sometimes a trace of the fingerprint remaining at the sensor unit is erroneously detected as a residual fingerprint in a state where for example the finger is separated from the sensor unit. Specifically, a trace of a fingerprint remains by, for example, a wet finger. The fingerprint sensor sometimes erroneously operates due to the fingerprint remains. There is a problem in that the verification precision is lowered due to the erroneous operation.

SUMMARY OF THE INVENTION

An object of the present invention is to provide an image verification system and an image verification method able to verify a fingerprint with a high precision without erroneously detecting a residual fingerprint.

According to a first aspect of the invention, an image verification system is provided comprising of a fingerprint sensing means for sensing the fingerprint, an image data storing means for storing image data of the fingerprint sensed by the fingerprint sensing means as first image data, a residual fingerprint judging means for comparing second image data of a fingerprint newly sensed by the fingerprint sensing means with the first image data stored by the image data storing means and judging whether or not the second image data indicates a residual fingerprint, and a verification processing means for verifying the second image data sensed by the sensing means in accordance with the result of judgment of the residual fingerprint judging means.

Preferably, the residual fingerprint judging means judges that the second image data is image data indicating a residual fingerprint when the first image data stored by the storing means and the second image data match and judges that the second image data is not image data indicating a residual fingerprint when the first image data and the second image data do not match, and the verification processing means does not verify the second image data when the residual fingerprint judging means judges that the second image data is image data indicating a residual fingerprint and verifies the second image data when the residual fingerprint judging means judges that the second image data is not image data indicating a residual fingerprint.

Alternatively, the residual fingerprint judging means performs pattern matching processing on the basis of the first image data and the second image data and judges whether or not the second image data indicates a residual fingerprint on the basis of the result of the pattern matching processing.

According to a second aspect of the invention, an image verification system is provided for verifying image data of a fingerprint, comprising a fingerprint sensing means for sensing a fingerprint, a position data generating means for generating position data of the fingerprint on the basis of image data of the fingerprint sensed by the fingerprint sensing means, a storing means for storing the position data generated by the position data generating means as first position data, and a residual fingerprint judging means for comparing second position data corresponding to image data of a fingerprint newly sensed by the fingerprint sensing means and the first position data stored by the storing means and judging whether or not the newly sensed image data indicates a residual fingerprint.

Preferably, the storing means stores the image data of the fingerprint and the first position data at the time of verification of the fingerprint in association; and the residual fingerprint judging means compares the second position data corresponding to the image data of the fingerprint newly sensed by the fingerprint sensing means and the first position data stored by the storing means and judges whether or not the newly sensed image data indicates a residual fingerprint when the image data of the fingerprint newly sensed by the fingerprint sensing means and the image data of the fingerprint stored by the storing means match as a result of the verification.

Alternatively, the position data generating means generates the position data on the basis of the result of the pattern matching processing between the image data stored by the storing means and the image data newly sensed by the fingerprint sensing means.

According to a third aspect of the invention, an image verification method is provided comprising the steps of storing image data obtained by sensing a fingerprint as first image data, comparing second image data of a newly sensed fingerprint and the stored first image data and judging whether or not the second image data indicates a residual fingerprint, and verifying the second image data sensed by the sensing means in accordance with the result of the judgment.

Preferably, when the first image data and the second image data match, it is judged that the second image data is image data indicating a residual fingerprint and the second image data is not verified, and when the first image data and the second image data do not match, it is judged that the second image data is not image data indicating a residual fingerprint, and the second image data is verified.

Alternatively, when judging whether or not the second image data is image data indicating a residual fingerprint, the pattern matching processing is carried out on the basis of the first image data and the second image data, and it is judged whether or not the second image data is image data indicating a residual fingerprint on the basis of the result of the pattern matching processing.

According to a fourth aspect of the invention, an image verification method is provided for verifying image data of a fingerprint, comprising of the steps of generating position data of the fingerprint on the basis of image data obtained by sensing the fingerprint, storing the generated position data as first position data, and comparing second position data corresponding to image data of a newly sensed fingerprint and the first position data stored by the storing means and judging whether or not the newly sensed image data is image data indicating a residual fingerprint.

Preferably, the image data of the fingerprint and the first position data at the time of the verification of the fingerprint are stored in association, and when judged whether or not the newly sensed image data is image data indicating a residual fingerprint, when the result of the verification between the image data of the newly sensed fingerprint and the image data of the fingerprint to be stored is that they match, the second position data corresponding to the image data of the newly sensed fingerprint and the first position data to be stored are compared, and it is judged whether or not the newly sensed image data indicates a residual fingerprint.

Alternatively, when generating the position data, the position data is generated on the basis of the result of the pattern matching processing between the stored image data and the newly sensed image data.

BRIEF DESCRIPTION OF THE DRAWINGS

These and other objects and features of the present invention will become clearer from the following description of the preferred embodiments given with reference to the accompanying drawings, in which:

FIG. 16 is a view for explaining the data stored by a memory according to the second embodiment;

FIG. 18 is a view for explaining the data stored by the memory of the image verification system of a third embodiment according to the present invention; and FIG. 19 is a flow chart for explaining the operation of the third embodiment of the image verification system according to the present invention.

DESCRIPTION OF THE PREFERRED EMBODIMENTS

Below, preferred embodiments will be described with reference to the accompanying drawings.

In order to prevent erroneous detection due to a residual fingerprint, an image verification system according to a first embodiment of the present invention stores fingerprint data of, for example, an immediately previously sensed fingerprint, judges whether or not a fingerprint is a residual fingerprint by first comparing it with the stored fingerprint data when newly sensing a fingerprint (at for example the second time), and, when judging that the newly sensed fingerprint data is not a residual fingerprint, verifies the fingerprint data. Below, a detailed explanation will be given with reference to the drawings.

Figure 1:
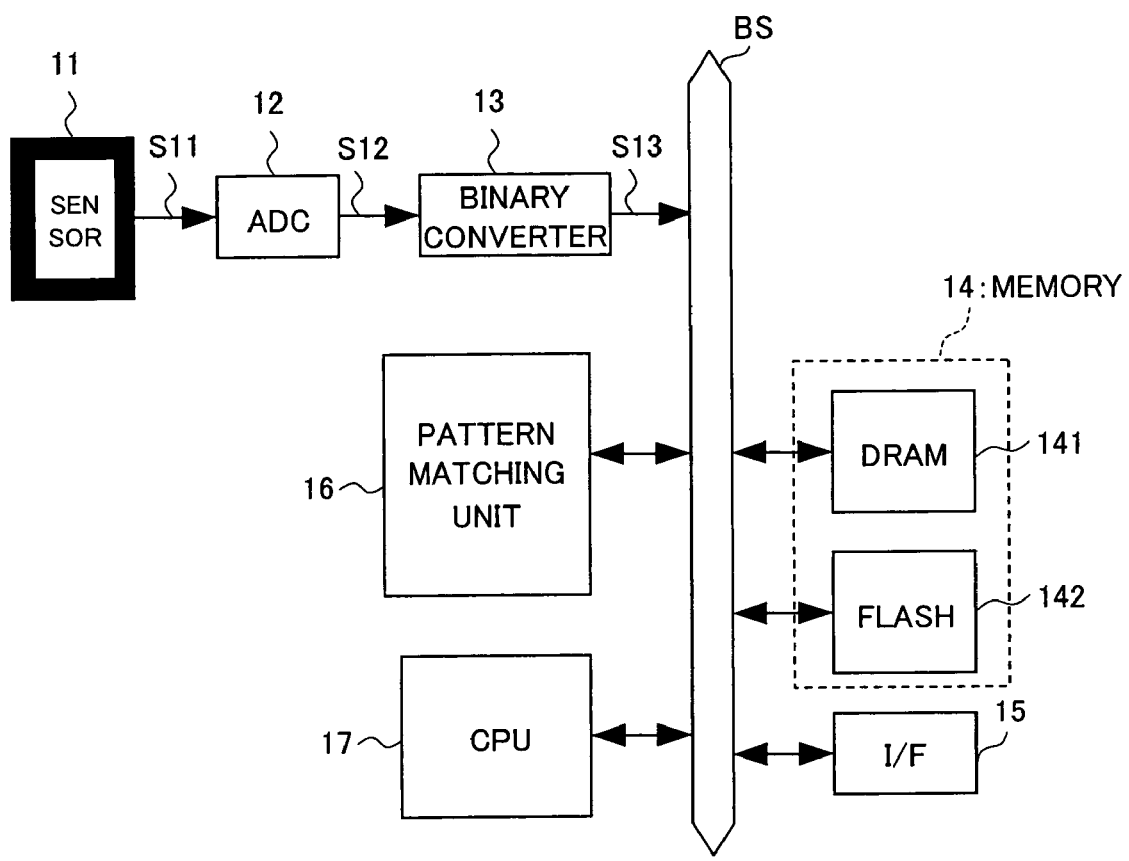
FIG. 1 is a functional block diagram of a first embodiment of an image verification system according to the present invention.

FIG. 1 is a functional block diagram of a first embodiment of a image verification system according to the present invention. The image verification system 1 according to the present embodiment has, as shown in FIG. 1, a fingerprint sensor unit (sensor) 11, an analog/digital converter (ADC) 12, a binary converter 13, a memory 14, an interface (I/F) 15, a pattern matching unit 16, and a central processing unit (CPU) 17.

The fingerprint sensor unit 11, the ADC 12, the binary converter 13, the memory 14, the I/F 15, the pattern matching unit 16, and the CPU 17 are connected by a bus BS.

Figure 2:
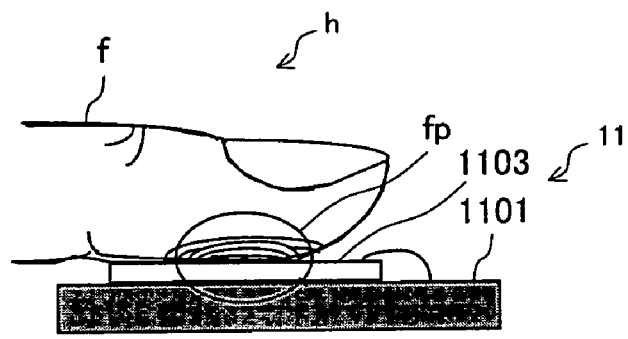
FIG. 2 is a conceptual view explaining a sensor unit of the image verification system shown in FIG. 1.
Figure 3:
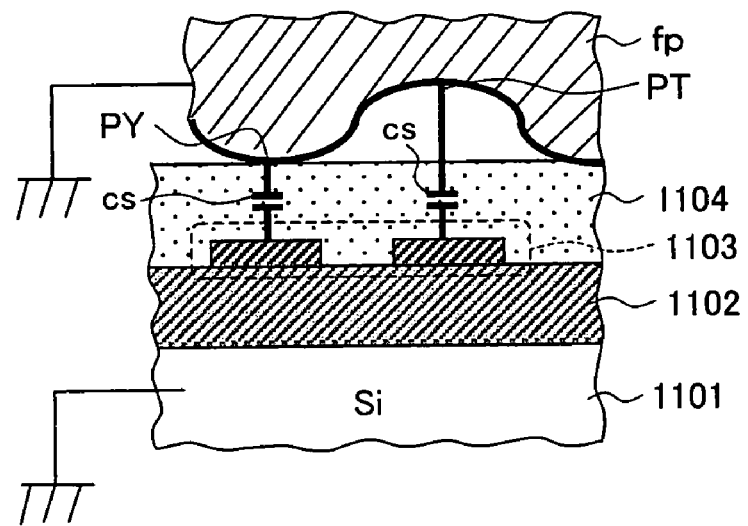
FIG. 3 is a view enlarging the sensor unit shown in FIG. 2.

The fingerprint sensor unit 11 reads a fingerprint fp and outputs it as a signal S11 to the ADC 12. FIG. 2 is a conceptual view for explaining the sensor unit of the image verification system shown in FIG. 1. FIG. 3 is a view enlarging the sensor unit shown in FIG. 2. An electrostatic capacitance type fingerprint sensor unit 11 will be explained in the present embodiment.

The fingerprint sensor unit 11 has, as shown in, for example, FIGS. 2 and 3, a substrate 1101, an insulation film 1102, detection electrodes 1103, and a protection film 1104. The substrate 1101 is a semiconductor substrate formed by, for example, silicon (Si). The insulation film 1102 is provided on the substrate 1101. The detection electrodes 1103 are comprised of a plurality of detection electrodes in a matrix on, for example, the insulation film 1102. The protection film 1104 is an insulation film formed so as to cover the detection electrodes 1103 and protects the detection electrodes 1103.

The fingerprint sensor unit 11 detects a fingerprint fp by detecting capacitors Cs formed in accordance with the detection electrodes 1103 and the valleys and ridges on the surface of the finger f when the finger f is brought into contact with the protection film 1104.

In more detail, for example, as shown in FIG. 3, capacitors Cs are formed by detection electrodes 1103, the insulation film 1102, and the finger f. The difference between a ridge and a valley of a fingerprint fp is the difference of distances up to the detection electrodes 1103. This is detected as the difference of the capacitances of the capcitors Cs.

When applying a constant voltage to the detection electrodes 1103, the difference of the capacitances of the capacitors Cs is detected as the difference of the charges. Therefore, by converting the charges to voltages, it becomes possible to detect valleys and ridges of the fingerprint fp as electric signals.

Figure 4:
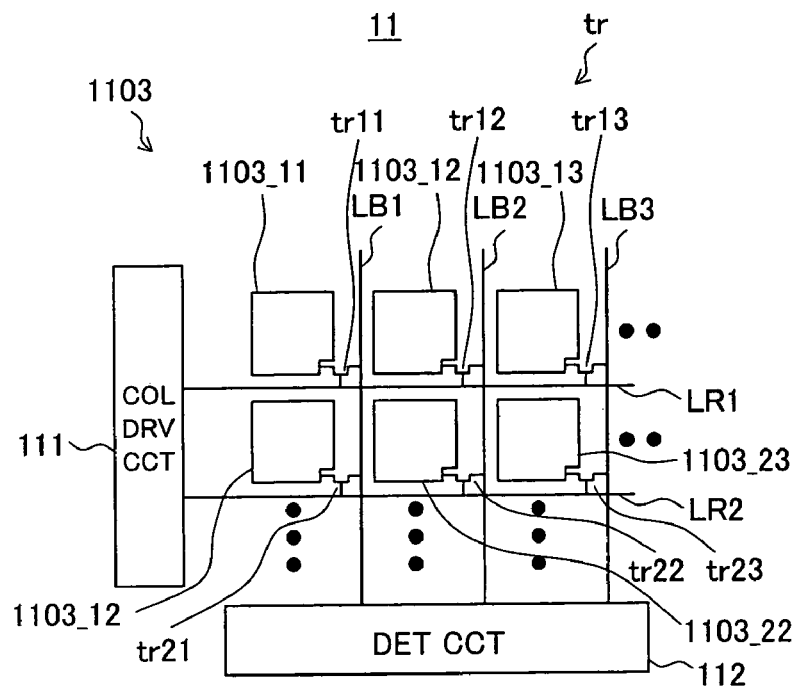
FIG. 4 is a view for explaining a fingerprint sensor unit shown in FIG. 3.

FIG. 4 is a view for explaining the fingerprint sensor unit shown in FIG. 3. The fingerprint sensor unit 11 has, as shown in, for example, FIG. 4, a column drive circuit 111, a detection circuit 112, transistors tr, and detection electrodes 1103. The electrodes 1103, as mentioned above, comprise a plurality of detection electrodes 1103_11, 1103_12, 1103_13 to nm, . . . , 1103_21, 1103_22, 1103_23, . . . are provided in a matrix.

The column drive circuit 111 is connected to column lines LR, for example, FIG. 4 demonstrates a plurality of column lines LR1, LR2, . . . . The detection circuit 112 is connected to row lines LB, for example, FIG. 4 demonstrates a plurality of row lines LB1, LB2, LB3, . . . . A gate of each transistor tr is connected to a column line LR, a drain is connected to a row line LB, and a source is connected to a detection electrode 1103. The fingerprint sensor unit 11 selects the detection electrodes 1103 in units of columns by, for example, the column drive circuit 111. The detection signals of the selected detection electrodes 1103 are input to the detection circuit 112 configured by, for example, an amplifier and a shift register and are output as serial signals to the ADC 12.

As the detection method of a capacitor CS, for example, a voltage charging method and a charge charging method have been known. The voltage charging method is a method of charging a capacitor Cs with a constant voltage and acquiring the charge accumulated in this capacitor Cs. The charge charging method is a method of charging a constant charge in a capacitor Cs and detecting a voltage change (for a detailed explanation of these, see for example Japanese Unexamined Patent Publication No. 2003-28607). In the present embodiment, the fingerprint sensor unit 11 detects a capacitor Cs by the voltage charging method or the charge charging method.

Figure 5:
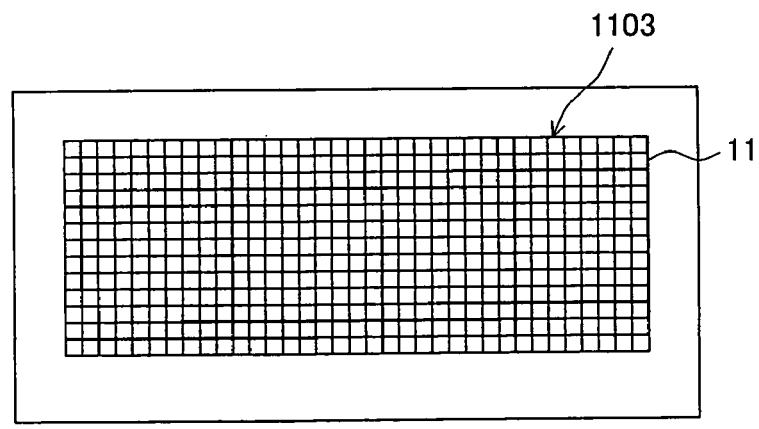
FIG. 5 is a front view of the sensor unit shown in FIG. 1.

FIG. 5 is a front view of the fingerprint sensor unit shown in FIG. 1. In the present embodiment, in the fingerprint sensor unit 11, for example, as shown in FIG. 5, the detection electrodes 1103 are formed so that the pitch of the detection electrodes 1103 is sufficiently smaller than the intervals of valleys and ridges of a fingerprint fp. For example, the size of the array of the detection electrodes 1103 is laterally 15 mm and vertically 20 mm. For example, when the pitch of the detection electrodes 1103 is set at 50 μm, 300×400 detection electrodes 1103 are provided.

The ADC 12 converts a signal S11 output from the fingerprint sensor unit 11 from an analog signal to a digital signal of predetermined gradations, for example 256 gradations, and outputs the same as a signal S12 to the binary converter 13. The binary converter 13 converts the signal S12 indicating the fingerprint data to a binary value on the basis of the predetermined threshold value and outputs the binary fingerprint data d_fp as a signal S13.

For example, the fingerprint fp is sensed by the fingerprint sensor unit 11 and inputted via the ADC 12 and the binary converter 13 as the fingerprint data to the CPU 17.

The memory 14 stores registered fingerprint data d_fpr and recent fingerprint data d_fprc. For example, under the control of the CPU 17, the registered fingerprint data d_fpr and the recent fingerprint data d_fprc stored by the memory 14 are read and written. Further, the memory 14 has a program PRG describing the processing functions according to the present invention. The CPU 17 realizes the processing functions according to the present invention by running the program PRG by using, for example, the memory 14 as a work region.

The memory 14 has, as shown in, for example, FIG. 1, a dynamic random access memory (DRAM) 141, a flash memory 142, etc. The DRAM 141 stores, for example, the recent fingerprint data d_fprc, while the flash memory 142 stores, for example, the registered fingerprint data d_fpr. The I/F 15 communicates with an external information processing device under the control of the CPU 17. The I/F 15 is configured by, for example, a universal serial bus (USB) and a universal asynchronous receiver-transmitter (UART).

The pattern matching unit 16 is a circuit for the pattern matching processing mentioned later. In the present embodiment, preferably the pattern matching processing is carried out by a hardware dedicated circuit for high speed pattern matching processing. The pattern matching processing is not limited to this format. It is also possible to realize this by, for example, the CPU 17 running a program PRG having the pattern matching processing functions mentioned later. The CPU 17 controls, for example. the fingerprint sensor unit 11, the ADC 12, the binary converter 13, the memory 14, the I/F 15, and the pattern matching unit 16.

Figure 6:
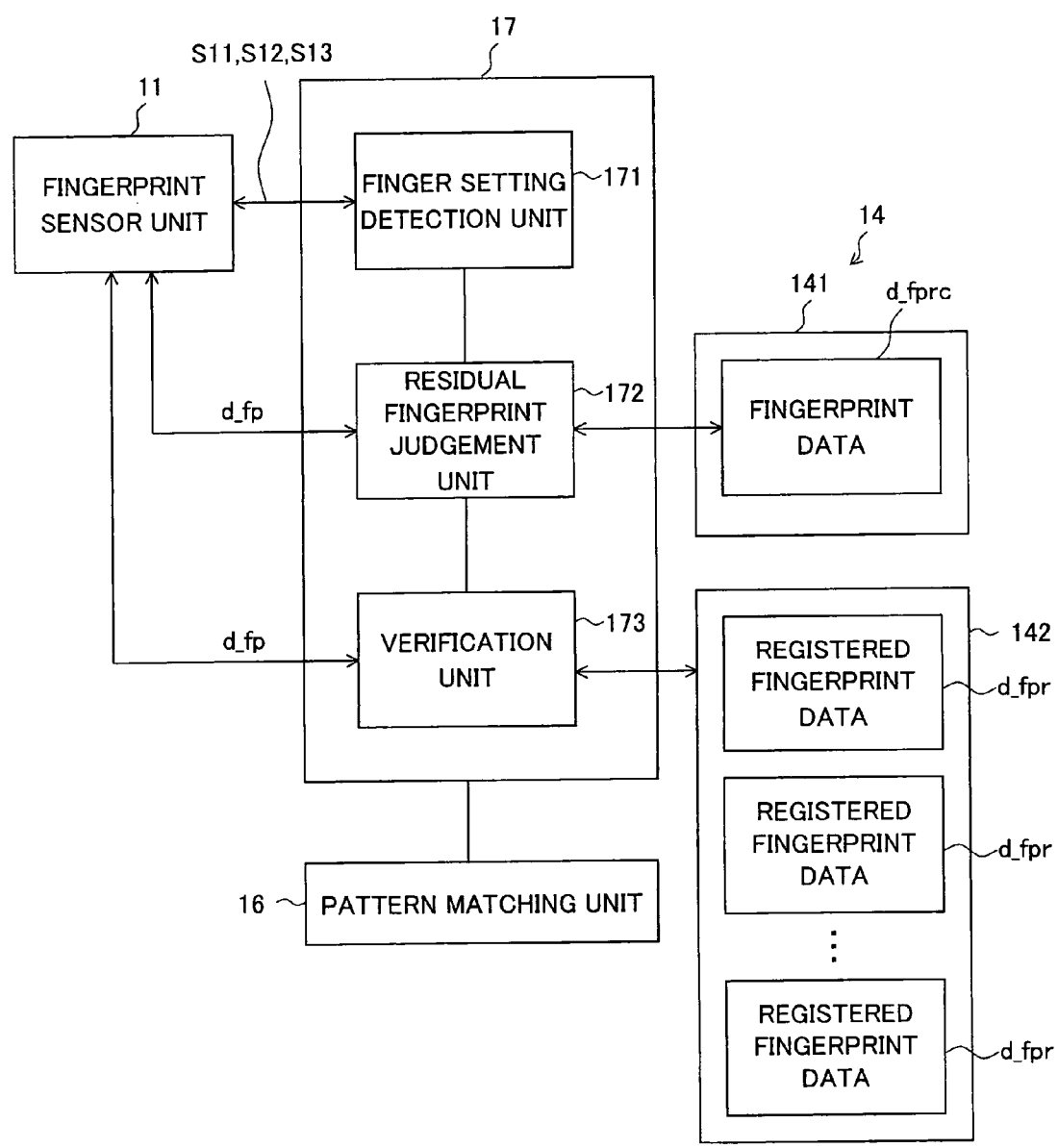
FIG. 6 is a functional block diagram for explaining processing functions of the image verification system shown in FIG. 1.

FIG. 6 is a functional block diagram for explaining the processing functions of the image verification system shown in FIG. 1. For example, by the CPU 17 running the program PRG, as shown in FIG. 6, the processing functions of the finger setting detection unit 171, residual fingerprint judgment unit 172, and verification unit 173 are realized. The residual fingerprint judgment unit 172 corresponds to the residual fingerprint judging means according to the present invention, while the verification unit 173 corresponds to the verification processing means according to the present invention.

Figure 7:
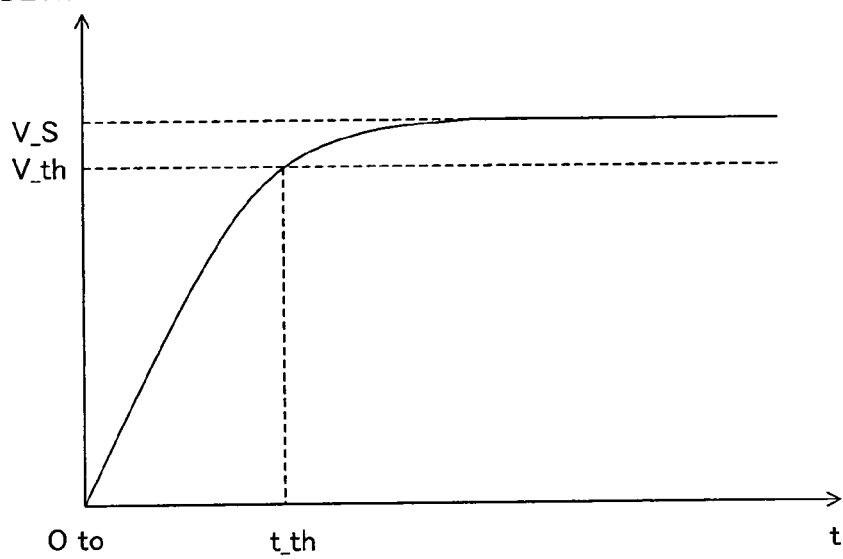
FIG. 7 is a view for explaining the operation of a finger setting detection unit shown in FIG. 6.

FIG. 7 is a view for explaining the operation of the finger setting detection unit shown in FIG. 6. The fingerprint sensor unit 11 is characterized in that, for example, as shown in FIG. 7, when the finger f contacts the surface of the fingerprint sensor unit 11 (time tO), the sum of detection levels from the detection electrodes 1103 of the fingerprint sensor unit 11 increases as shown in FIG. 7, and a signal S11 saturated at a predetermined value V_S after a predetermined time t is outputted.

The finger setting detection unit 171 judges whether or not the finger f contacts the fingerprint sensor unit 11 on the basis of the sum of detection levels of the detection electrodes 1103 of, for example, the fingerprint sensor unit 11. For example, in more detail, when the sum of the detection levels of the detection electrodes 1103 of the fingerprint sensor unit 11 is smaller than the saturated value V_S and larger than the substantially saturated value constituted by the threshold value V_th, the finger setting detection unit 171 judges that the finger f contacts the fingerprint sensor unit 11. When it is smaller than the threshold value V_th, it judges that the finger f does not contact the fingerprint sensor unit 11 and outputs the judgment result.

Figure 8:
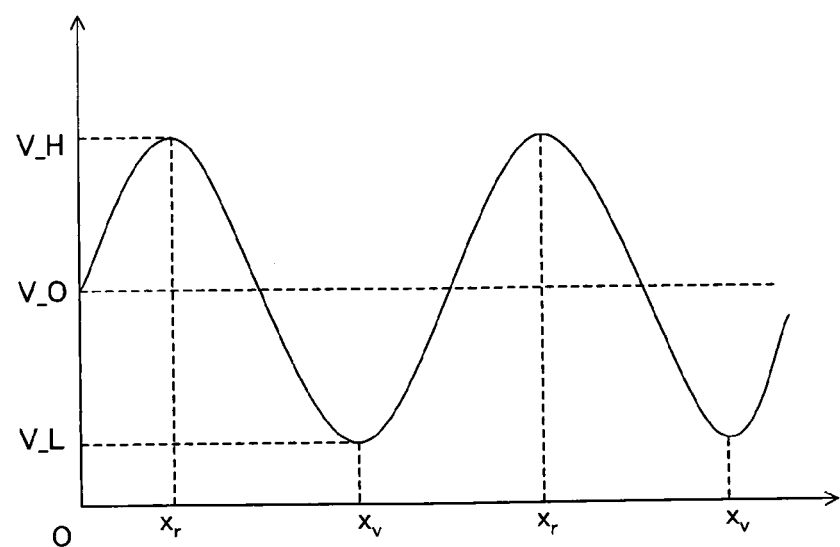
FIG. 8 is a view for explaining the operation of the finger setting detection unit shown in FIG. 6.

FIG. 8 is a view for explaining the operation of the finger setting detection unit shown in FIG. 6. Further, when, for example, the finger fp contacts the surface of the fingerprint sensor unit 11, the fingerprint sensor unit 11 outputs a signal having a value V_H higher than a mean value V_0 at a ridge part xr of a fingerprint fp and a signal having a value V_L lower than the mean value V_0 at a valley part xv of the fingerprint fp when defining a predetermined level V_0 as the mean value, for example, as shown in FIG. 8 when making the abscissa an axis along the detection electrodes 1103 and the ordinate the detection levels of the detection electrodes 1103.

The finger setting detection unit 171 judges whether or not the finger f contacts the fingerprint sensor unit 11 on the basis of whether or not the detection level along the detection electrodes 1103 fluctuates about the mean value. For example, in more detail, as shown in FIG. 8, the finger setting detection unit 171 judges that the finger f contacts the fingerprint sensor unit 11 when the detection level along the detection electrodes 1103 fluctuates about the mean value V_0, and judges that the finger f does not contact the fingerprint sensor unit 11 where it does not fluctuate.

Further, the fingerprint sensor unit 11 may also judge whether or not the finger f contacts the fingerprint sensor unit 11 on the basis of the sum of the detection levels of the detection electrodes 1103 mentioned above and judges whether or not the finger f contacts the fingerprint sensor unit 11 on the basis of whether or not the detection level along the detection electrodes 1103 fluctuates about the mean value.

The residual fingerprint judgment unit 172 judges whether or not the fingerprint data d_fp indicates a residual fingerprint on the basis of the fingerprint data d_fp of the fingerprint fp newly sensed by the fingerprint sensor unit 11 and the fingerprint data d_fprc stored by the memory 14.

Figure 9:
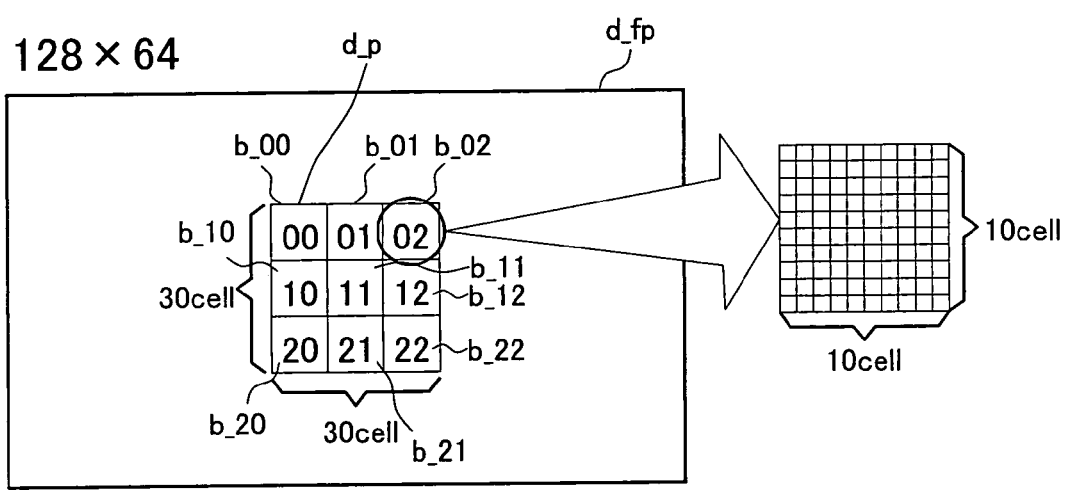
FIG. 9 is a view for explaining the operation of a residual fingerprint judgment unit shown in FIG. 1.

FIG. 9 is a view for explaining the operation of the residual fingerprint judgment unit shown in FIG. 1. The residual fingerprint judgment unit 172 extracts partial data d_p, for example, the center part, of the fingerprint data d_fp output from, for example, the fingerprint sensor unit 11 as the verification data. For example, the residual fingerprint judgment unit 172 extracts partial data d_p of 30×30 cells as shown in FIG. 9.

The residual fingerprint judgment unit 172 divides the data to a plurality of blocks b_00 to b_nn, having predetermined sizes, as the partial data d_p and performs the pattern matching processing between the blocks b_00 to b_nn and the fingerprint data d_fprc.

For example, in more detail, the residual fingerprint judgment unit 172 divides the partial data d_p of 30×30 cells to, for example, nine blocks b_00 to b_22 as shown in, for example, FIG. 9 by defining a size of 10×10 cells as one block b.

Figures 10A, 10B:
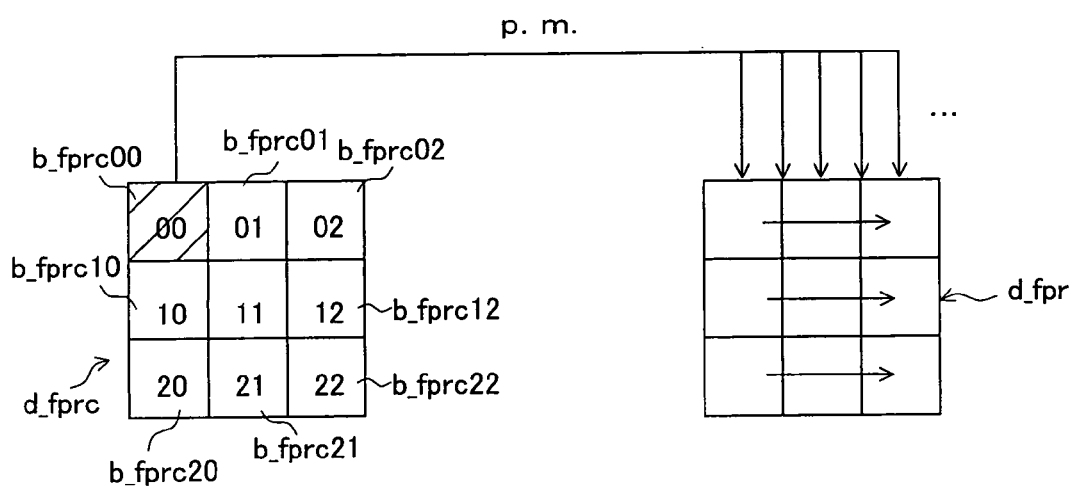
FIGS. 10A and 10B are schematic views for explaining pattern matching processing.

FIGS. 10A and 10B are schematic views for explaining the pattern matching processing. The residual fingerprint judgment unit 172 makes the pattern matching unit 16 perform pattern matching processing between the fingerprint data d_fprc stored by, for example, the memory 14 and the fingerprint data d_fp newly sensed by the fingerprint sensor unit 11. For example, as the pattern matching processing, as shown in FIG. 10A, pattern matching processing with the fingerprint data d_fp newly sensed by the fingerprint sensor unit 11 shown in FIG. 10B is carried out while shifting the block b_fprc00 of the fingerprint data d_fprc stored by the memory 14 by one cell at a time. In more detail, in the pattern matching processing, an exclusive OR operation is carried out for each of the cells in the fingerprint data d_fprc00 and each of corresponding cells in the fingerprint data d_fp and the number of matching cells is added up. The same processing is carried out while shifting the block by one cell at a time.

Figure 11A:
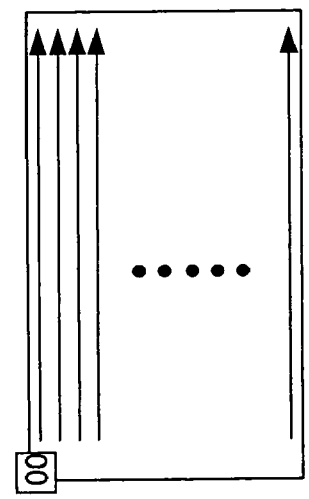
FIGS. 11A and 11B are views for explaining a summation result of the pattern matching processing.
Figure 11B:
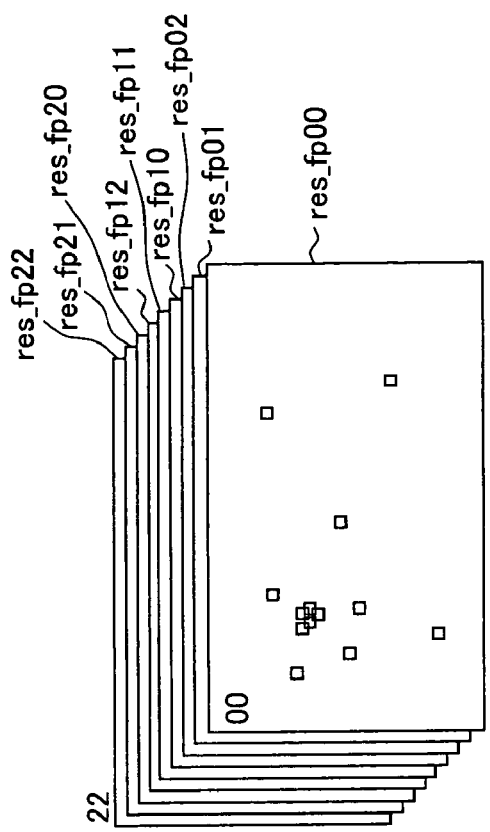

FIGS. 11A and 11B and FIGS. 12A to 12D are views for explaining the sum of the pattern matching processing. By the pattern matching processing, for example, the numbers of cells matching by one pattern matching processing are plotted in order from the largest down. For example, as shown in FIG. 11A, the numbers of matching cells are summed up and the points are plotted corresponding to the first to 10th positions in the order of the results of summation to thereby generate the verification result data res_fp00. In the same way as the above, the pattern matching processing is performed, as shown in FIG. 11B, in the same way for the blocks b_fprc00 to b_fprc22 to generate the verification result data res_fp00 to res_fp22.

Figure 12A:
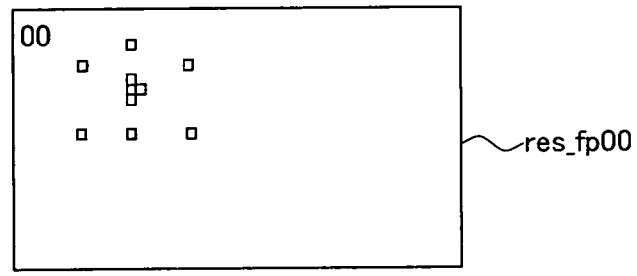
FIGS. 12A to 12D are views for explaining the summation result of the pattern matching processing.
Figure 12B:
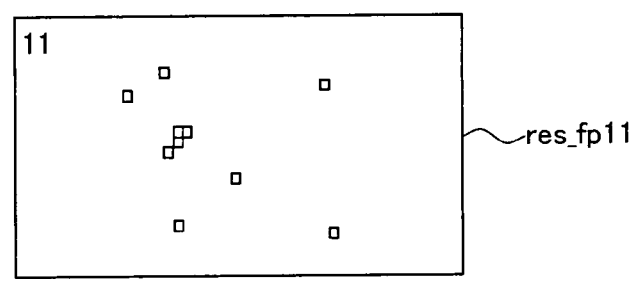
Figure 12C:
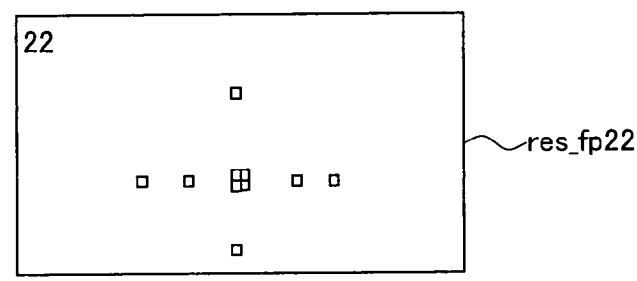

For a simple explanation, when explaining this for the block b_fprc00 and blocks b_fprc11 and b_fprc22, the verification result data res_fp00, res_fp11, and res_fp22 are generated as shown in, for example, FIGS. 12A, 12B, and 12C, on the basis of the block b_fprc00 and the blocks b_fprc11 and b_fprc22.

For example, b_fprc00 and b_fprc11 are offset by 10 cells in the vertical and lateral directions in positional relationship. The positional relationship of the blocks is corrected to move the results of the block verification to the center. Specifically, the point of res_fp00 of the verification result of the block b_fprc00 is moved to the right by 10 cells and to the bottom by 10 cells toward the figure. Further, the point of res_fp22 of the verification result of the block b_fprc22 is moved to the top by 10 cells and to the left by 10 cells toward the figure. The resultant data res_fp00, res_fp11, and res_fp22 are superimposed as shown in FIG. 12D.

Figure 12D:
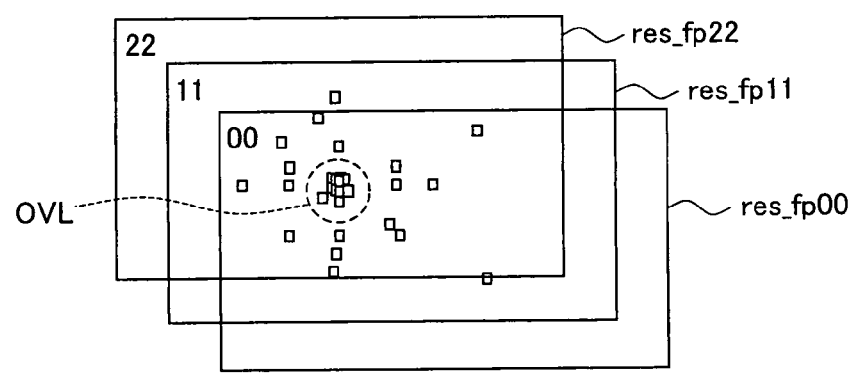

Further, although not illustrated, verification results res_fp00 to res_fp22 corresponding to the blocks b_fp00 to b_fp22 are moved on the basis of the positional relationship of the processed blocks b_fp00 to b_fp22 and are superimposed on each other.

Where the degree of match between the fingerprint data d_fp sensed by the fingerprint sensor unit 11 and the registered fingerprint data d_fpr is high, for example, as shown in FIG. 12D, the degree of overlap of the points in a region OVL where the points of the verification result data res_fp00 to res_fp22 are superimposed is large. For example, when shifting the verification resultant data res_fp00 to res_fp22 to superpose the points, a maximum of nine points are superimposed. The residual fingerprint judgment unit 172 judges whether or not a fingerprint is a residual fingerprint in accordance with the degree of the overlap of these points.

Figure 13:
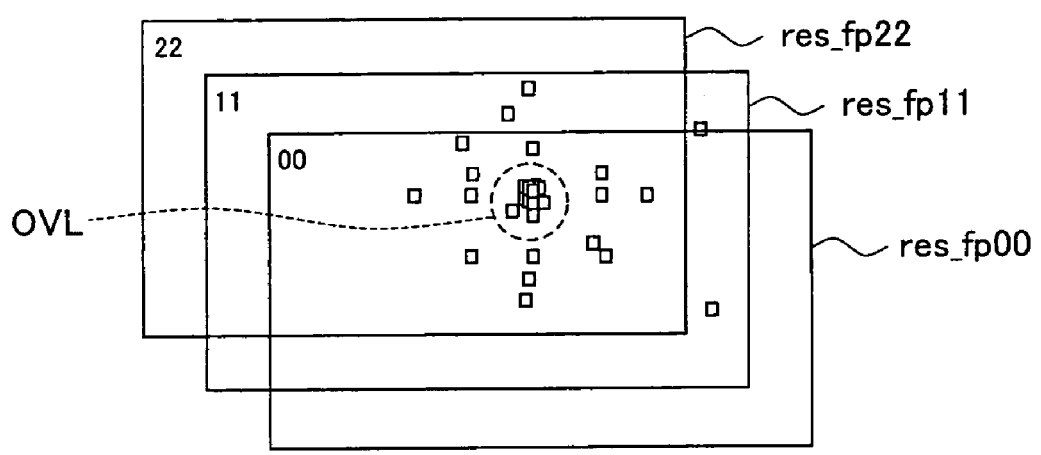
FIG. 13 is a view for explaining the pattern matching processing when the position of the finger is offset.

FIG. 13 is a view for explaining the pattern matching processing when the position of the finger is offset. Further, when the position of the finger f and the position of the finger f when sensing the registered fingerprint data d_fpr are offset at the time of the pattern matching processing, as shown in FIG. 13, the position of the region OVL where the points overlap is offset, but a distribution of points the same as that in FIG. 12D is obtained.

The verification unit 173 verifies the fingerprint data d_fp sensed by the fingerprint sensor unit 11 in accordance with the result of the judgment of the residual fingerprint judgment unit 172. In more detail, the verification unit 173 does not verify the fingerprint data d_fp when the residual fingerprint judgment unit 172 judges that the fingerprint data d_fp is fingerprint data indicating a residual fingerprint. Further, the verification unit 173 verifies the fingerprint data d_fp against the registered fingerprint data d_fpr stored by the memory 14 when the residual fingerprint judgment unit 172 judges that the fingerprint data d_fp is not fingerprint data indicating a residual fingerprint.

Figure 14:
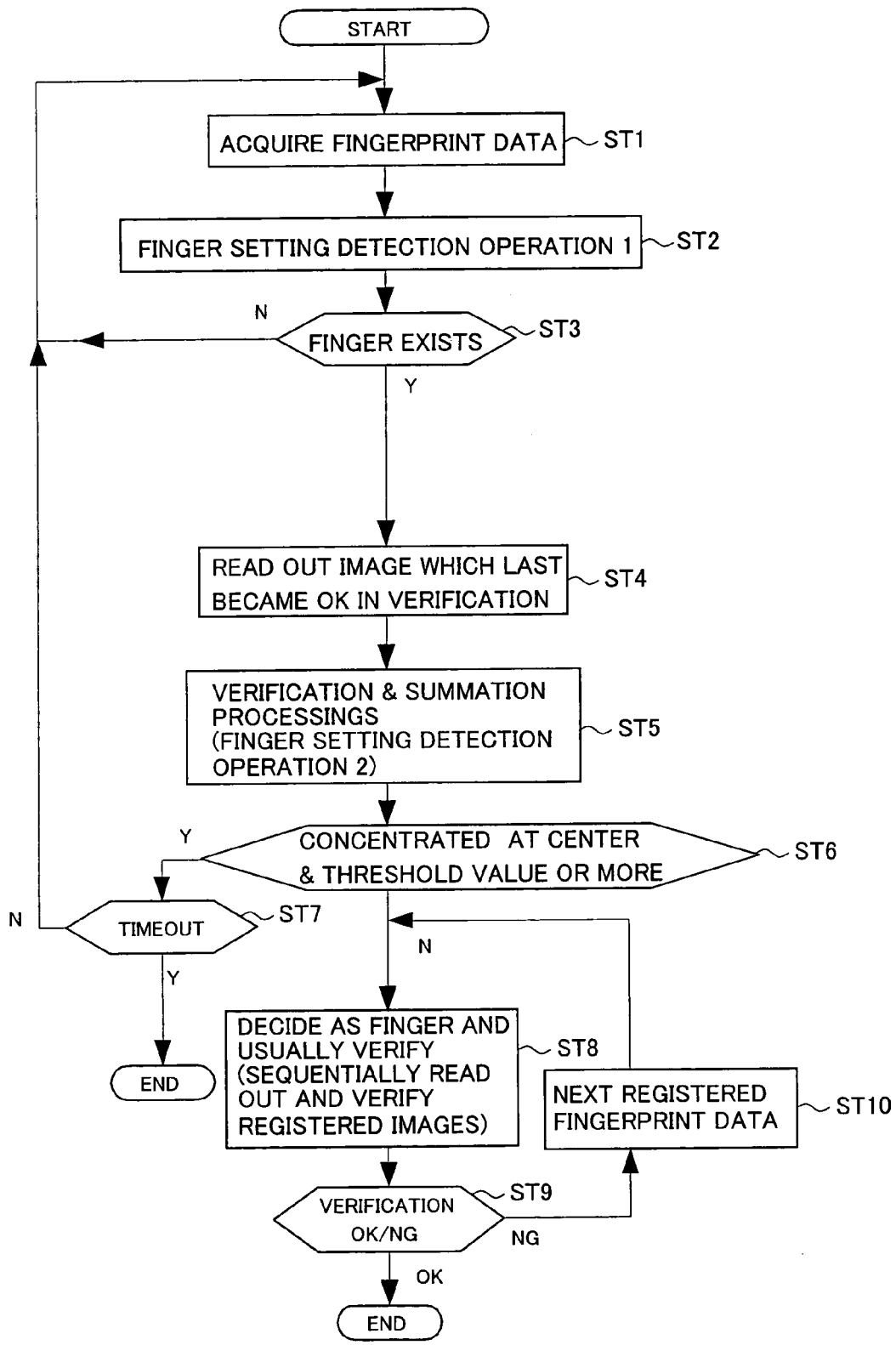
FIG. 14 is a flow chart for explaining the operation of the image verification system shown in FIG. 1.

FIG. 14 is a flow chart for explaining the operation of the image verification system shown in FIG. 1. Referring to FIG. 14, an explanation will be given of the operation of the image verification system 1 centered on the processings of the CPU 17 and the pattern matching unit 16.

At step ST1, for example, detection electrodes 1103 of the fingerprint sensor unit 11 output signals S11 indicating the detection levels. At step ST2, in the CPU 17, the finger setting detection unit 171 judges whether or not a finger f contacts the fingerprint sensor unit 11 on the basis of the sum of the detection levels from the detection electrodes 1103 of the fingerprint sensor unit 11 as shown in, for example, FIG. 7.

For example, in more detail, the finger setting detection unit 171 judges that a finger f contacts the fingerprint sensor unit 11 when the sum of the detection levels from the detection electrodes 1103 of the fingerprint sensor unit 11 is smaller than the saturated value V_S and larger than the threshold value V_th having schematically the same value as the saturated value V_S, and judges that a finger f does not contact the fingerprint sensor unit 11 when the sum of the detection levels is smaller than the threshold value V_th, and outputs the judgment result.

Further, as shown in FIG. 8, the finger setting detection unit 171 judges whether or not a finger f contacts the fingerprint sensor unit 11 on the basis of whether or not the detection level along the detection electrodes 1103 fluctuates about a mean value. For example, in more detail, as shown in FIG. 8, when the detection level along the detection electrodes 1103 fluctuates about the mean value V_0, the finger setting detection unit 171 judges that a finger f contacts the fingerprint sensor unit 11, while, when it does not fluctuate, the finger setting detection unit 171 judges that a finger f does not contact the fingerprint sensor unit 11.

At step ST3, if the finger setting detection unit 171 judges that a finger f does not contact the fingerprint sensor unit 11, that is, a finger f is not placed on the fingerprint sensor unit 11, the routine returns to the processing of step ST1. Further, in the judgment of step ST3, if the finger setting detection unit 171 judges that a finger f contacts the fingerprint sensor unit 11, that is, a finger f is placed on the fingerprint sensor unit 11, the routine proceeds to the processing of step ST4.

At step ST4, the residual fingerprint judgment unit 172 reads out the fingerprint data d_fprc immediately before storage by the memory 14, for example, the fingerprint data _fprc obtained by storing the fingerprint data d_fp for which verification was last normally carried out in the memory 14.

At step ST5, the residual fingerprint judgment unit 172 judges whether or not the fingerprint data d_fp is data indicating a residual fingerprint on the basis of the fingerprint data_fprc and the new fingerprint data d_fp input via the ADC 12 and the binary converter 13 constituted by the signal S11. In more detail, the residual fingerprint judgment unit 172 makes the pattern matching unit 16 perform pattern matching processing and the summation processing. As a result of the pattern matching processing and the summation processing, the residual fingerprint judgment unit 172 shifts the points of the verification results res_fp00 to res_fp22 corresponding to the blocks b_fp00 to b_fp22 on the basis of the positional relationships of, for example, the blocks b_fp00 to b_fp22 to superimpose them on each other.

At step ST6, the residual fingerprint judgment unit 172 judges whether or not a fingerprint is a residual fingerprint on the basis of the resultant degree of overlap of the points. In more detail, the residual fingerprint judgment unit 172 judges that the fingerprint data d_fp is a fingerprint data indicating a residual fingerprint on the basis of the resultant degree of overlap of the points, for example, when the degree of overlap is larger than a predetermined threshold value, i.e., in the present embodiment, when the degree of overlap of points is larger than a threshold value of 4 in a predetermined area, and proceeds to the processing of step ST7.

At step ST7, it is judged whether or not a predetermined time, for example about a few seconds, have passed. When it is judged that the predetermined time has passed, the series of processings is terminated, while when the predetermined time has not passed, the routine returns to the processing of step ST1.

On the other hand, when the degree of overlap of the points is smaller than the predetermined threshold value in the judgment of step ST6, it is judged that the newly sensed fingerprint data d_fp is not fingerprint data indicating a residual fingerprint, and the routine proceeds to the processing of step ST8.

In the processing of step ST8, the verification unit 173 verifies the newly sensed fingerprint data d_fp against a plurality of registered fingerprint data d_fpr stored by the memory 14. For example, the verification unit 173 makes the pattern matching unit 16 perform pattern matching processing and summation processing the same as those described above as the verification and performs the verification in accordance with the degree of overlap of the points.

At step ST9, the verification unit 173 verifies the newly sensed fingerprint data d_fp against the next registered fingerprint data d_fpr (also referred to as the registered image) in the memory 14 when they do not coincide as the result of the verification processing with the registered fingerprint data d_fpr. Further, the verification unit 173 generates a signal S173 indicating the result and outputs the same when the new fingerprint data d_fp and the registered fingerprint data d_fp match and when the new fingerprint data d_fp does not match with any of the plurality of registered fingerprint data d_fpr stored by the memory 14. Further, for example, the residual fingerprint judgment unit 172 stores the finally verified fingerprint data d_fp in the memory 14 as the fingerprint data d_fprc.

As explained above, in the present embodiment, since provision was made of a fingerprint sensor unit 11 for sensing a fingerprint fp of a subject h, a memory 14 for storing the image data of the fingerprint fp sensed by the fingerprint sensor unit 11 constituted by fingerprint data d_fprc, a residual fingerprint judgment unit 172 for judging whether or not the fingerprint data d_fp is fingerprint data indicating a residual fingerprint by pattern matching processing on the basis of the image data of the fingerprint fp newly sensed by the fingerprint sensor unit 11 constituted by the fingerprint data d_fp and the fingerprint data d_fprc stored by the memory 14, and a verification unit 173 which does not verify the fingerprint data d_fp when the residual fingerprint judgment unit 172 judges that the fingerprint data d_fp is a residual fingerprint, while verifies it against the registered fingerprint data d_fpr when the residual fingerprint judgment unit 172 judges that the fingerprint data d_fp is not fingerprint data indicating a residual fingerprint, a fingerprint can be verified with a high precision without erroneously detecting a residual fingerprint.

Further, since a finger setting detection unit 171 for detecting whether or not a finger h of a subject contacts the fingerprint sensor unit 11 is provided, data of, for example, a low level as a residual fingerprint is eliminated on the basis of the detection processing of the finger setting detection unit 171, after the processing, data having a high level as a residual fingerprint is eliminated on the basis of the detection processing by the residual fingerprint judgment unit 172, and thereby residual fingerprints are doubly eliminated, therefore the image verification system 1 can perform the verification processing with a high precision.

Further, residual fingerprints are eliminated when registering the fingerprint data, so erroneous registration of residual fingerprints can be prevented.

Figure 15:
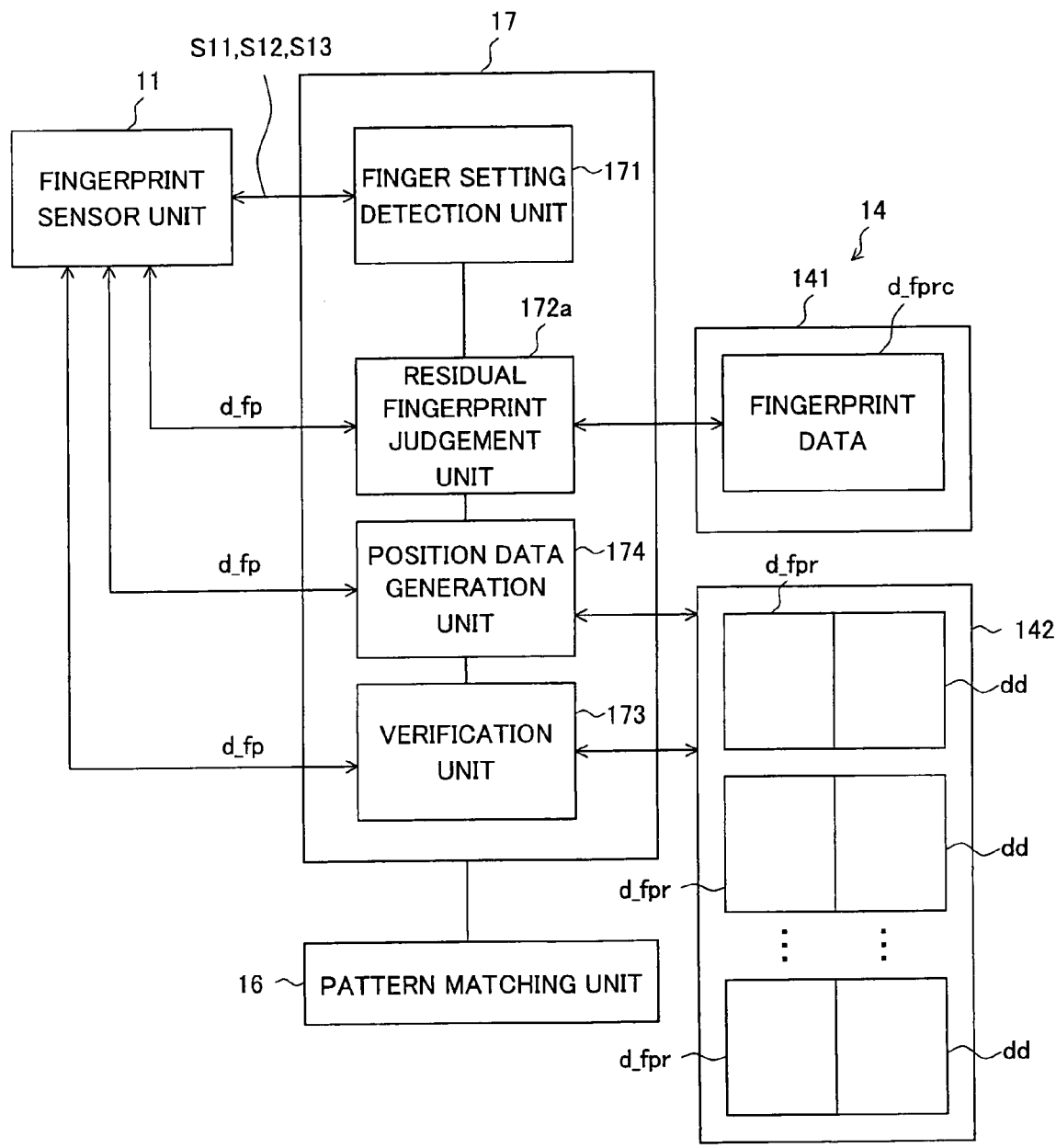
FIG. 15 is a functional block diagram of a second embodiment of the image verification system according to the present invention.

FIG. 15 is a functional block diagram of a second embodiment of an image verification system according to the present invention. In the image verification system 1 according to the first embodiment, the residual fingerprint was detected by storing the last verified fingerprint data d_fprc in the memory 14 and comparing it with the newly sensed fingerprint data d_fp, but in the image verification system 1a according to the present embodiment, a residual fingerprint is detected on the basis of the fingerprint data and the position data at the time of the last verification.

That is, the position of contact of a finger f at the fingerprint sensor unit 11 differs for every verification, therefore the position data of the fingerprint fp at the time of the verification and the position data of the fingerprint fp for which the verification was last carried out are compared. When the result of comparison is that they match, it is judged that the fingerprint is a residual fingerprint. Below, a detailed explanation will be given with reference to the drawings.

The hardware like functional blocks of the image verification system 1a according to the present embodiment are the same as the image verification system 1 according to the first embodiment shown in FIG. 1, so the explanation will be omitted here. The image verification system 1a realizes processing functions of the finger setting detection unit 171, the residual fingerprint judgment unit 172a, the verification unit 173, and the position data generation unit 174 as shown in FIG. 15 by, for example, the CPU 17 running the program PRG. The position data generation unit 174 corresponds to the position data generating means according to the present embodiment.

The major differences from the first embodiment reside in the points that the position data generation unit 174 is further provided and that the residual fingerprint judgment unit 172a judges whether or not the newly sensed fingerprint data is a residual fingerprint on the basis of the position data dd generated by the position data generation unit 174.

The position data generation unit 174 generates the position data dd on the basis of the fingerprint data d_fp of a fingerprint fp of a subject h sensed by the fingerprint sensor unit 11. In more detail, the position data generation unit 174 generates the position data dd on the basis of the position of the region OVL where the points are superimposed as a result of the pattern matching processing and the summation processing by the pattern matching unit 16 as shown in, for example, FIG. 12D and FIG. 13. The memory 14 stores the position data dd generated by the position data generation unit 174 and the fingerprint data d_fp in association.

For example, the position where the finger f of the subject h contacts the fingerprint sensor unit 11 differs for every verification. As shown in, for example, FIG. 12D and FIG. 13, the position of the region OVL where the points are superimposed differs as a result of the pattern matching processing and the summation processing by the pattern matching unit 16. Further, for example, the position data generation unit 174 generates the position data dd indicating the position of the region OVL where the points are superimposed when the degree of the overlap of the points is larger than a threshold value. This position data dd is updated in the case where the verification shows a match.

FIG. 16 is a view for explaining the data stored by a memory according to a second embodiment. The memory 14 of the image verification system 1a stores the registered fingerprint data d_fpr and the position data dd in association as shown in FIG. 16.

The memory 14 stores the registered fingerprint data d_fpr and the position data dd in association for every, for example, subject (also referred to as a "user"). For example, in more detail, the memory 14 stores fingerprint data d_fprA of a subject A and position data ddA of the fingerprint data d_fprA thereof in association as shown in FIG. 16, stores fingerprint data d_fprB of a subject B and position data ddB of the fingerprint data d_fprB thereof in association, . . . , and stores fingerprint data d_fprN of a subject N and position data ddN of the fingerprint data d_fprN thereof in association. Further, the position data dd includes for example x-coordinate data and y-coordinate data.

Figure 17:
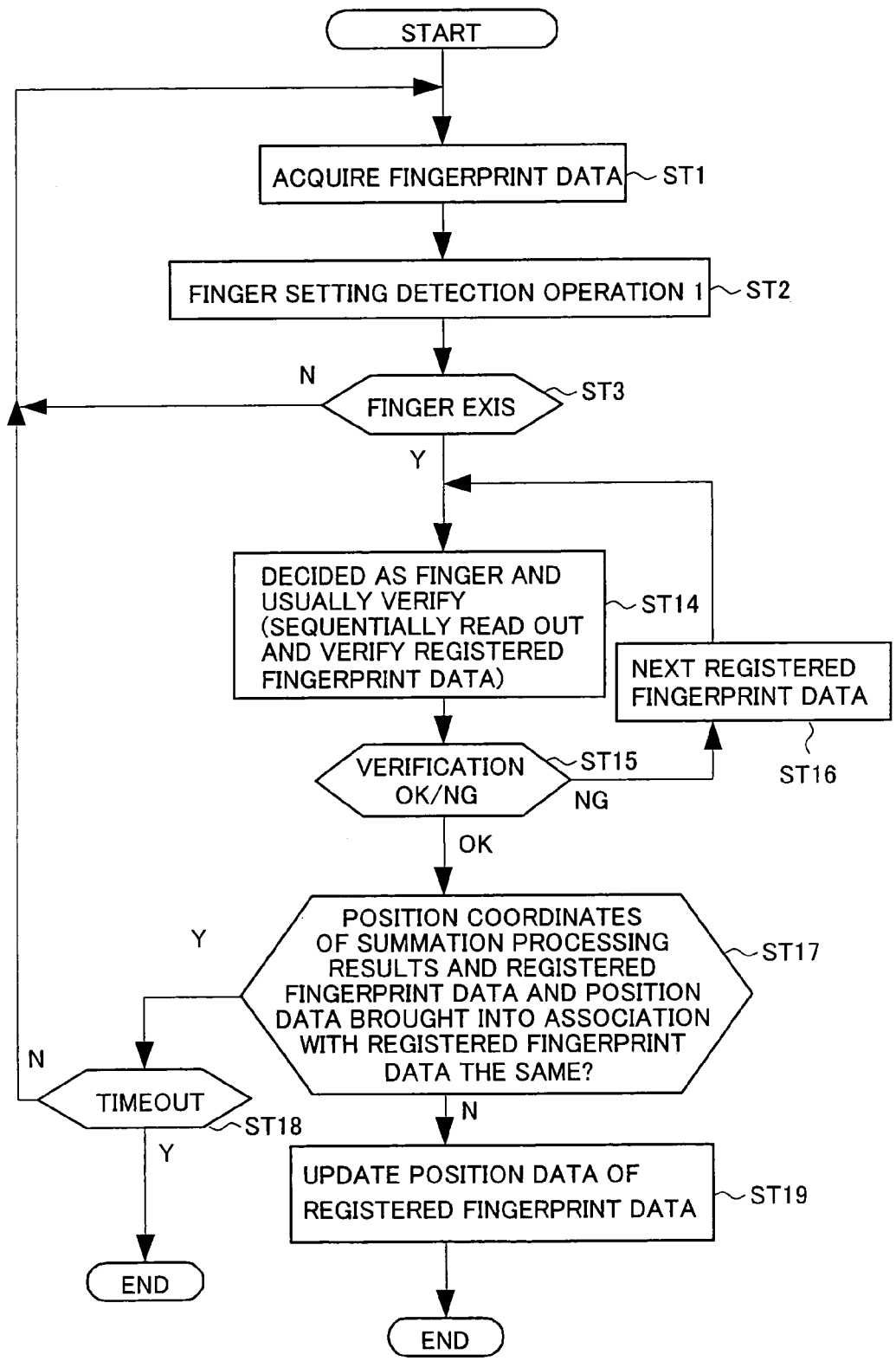
FIG. 17 is a flow chart for explaining the operation of the image verification system shown in FIG. 15.

FIG. 17 is a flow chart for explaining the operation of the image verification system shown in FIG. 15. Referring to FIG. 17, the operation of the image verification system 1a will be explained centered on the operation of the CPU 17. Only the differences from the first embodiment will be explained.

The processings of steps ST1 to ST3 are the same as those of the first embodiment, so the explanations will be omitted. At step ST14, when it is judged at steps ST1 to ST3 by the finger setting detection unit 171 that a finger f contacts the fingerprint sensor unit 11, the verification unit 173 makes the pattern matching unit 16 perform the pattern matching processing and the summation processing of the fingerprint data d_fp sensed in the same way as the first embodiment and the registered fingerprint data d_fpr is stored by the memory 14.

In more detail, the verification unit 173 performs the verification processing with the next registered fingerprint data d_fpr (also referred to as the registered image) in the memory 14 when the newly sensed fingerprint data d_fp and the registered fingerprint data d_fpr do not match as the result of the verification processing (ST15) (ST16). Further, when the new fingerprint data d_fp and the registered fingerprint data d_fpr match, the verification unit 173 proceeds to the processing of step ST17, while when the new fingerprint data d_fp does not match with any of the plurality of registered fingerprint data d_fpr stored by the memory 14, the series of processings is terminated.

At step ST17, the position data generation unit 174 generates the position data dd on the basis of the pattern matching processing and the sumation processing between the newly sensed d_fp and the registered fingerprint data d_fpr by the pattern matching unit 16. The residual fingerprint judgment unit 172a compares the position data dd generated by the position data generation unit 174 and the position data dd linked with the registered fingerprint data d_fpr stored by the memory 14 and judges whether or not the newly sensed fingerprint data d_fp is residual fingerprint data on the basis of the result of the comparison.

The residual fingerprint judgment unit 172a judges whether or not a predetermined time, for example, about a few seconds, have passed from when it judged that the fingerprint data d_fp was residual fingerprint data when the position data dd generated by the position data generation unit 174 and the position data dd linked with the registered fingerprint data d_fpr stored by the memory 14 matched (ST18). When it judges that the predetermined time has not passed, the routine returns to the processing of step ST1, while when it judges that the predetermined time has passed, the series of processing is ended.

On the other hand, when the result of the comparison of step ST19 is that the position data dd generated by the position data generation unit 174 and the position data dd linked with the registered fingerprint data d_fpr stored by the memory 14 do not coincide, the residual fingerprint judgment unit 172a judges that the newly sensed fingerprint data d_fp is not a residual fingerprint.

Further, when judging that the fingerprint data d_fp is not a residual fingerprint, the residual fingerprint judgment unit 172a rewrites the position data dd linked with the registered fingerprint data d_fpr by the position data dd generated by the position data generation unit 174 and updates the position data dd.

As explained above, in the present embodiment, since provision was made of a fingerprint sensor unit 11 for sensing a fingerprint fp of a subject h, a position data generation unit 174 for generating position data dd of the fingerprint fp on the basis of the fingerprint data d_fp sensed by the fingerprint sensor unit 11, a memory 14 for storing the position data dd generated by the position data generation unit 174 and the registered data d_fpr of the subject in association, and a residual fingerprint judgment unit 172a for judging whether or not the newly sensed image data d_dp is image data indicating the residual fingerprint on the basis of the position data dd corresponding to the fingerprint data d_fp newly sensed by the fingerprint sensor unit 11 and the position data dd stored by the memory 14, a fingerprint can be verified with a high precision without erroneously detecting a residual fingerprint.

Further, in comparison with the first embodiment, by comparing the position data dd having a small data size, it can be judged whether or not the newly sensed fingerprint data d_fp is a residual fingerprint, so the processing load is reduced. Further, the registered fingerprint data d_fpr and the position data dd are stored in association for every subject (user). When the result of the verification processing is that they coincide, the position data dd is updated. The comparison processing of the position data is carried out after the fingerprint verification processing for every subject. Therefore, a fingerprint can be verified with a higher precision than in the first embodiment without erroneously detecting a residual fingerprint.

FIG. 18 is a view for explaining the data stored by the memory of the image verification system of a third embodiment according to the present invention. An image verification system 1b according to the third embodiment has the same configuration as that of the image verification system 1a according to the second embodiment in terms of hardware.

The difference resides in the point that the registered fingerprint data d_fpr of the subject h and the position data dd to be stored by the memory 14 are stored for every subject (user) by bringing a plurality of registered fingerprint data d_fpr and the position data dd into association. The image verification system 1b compares the position data dd with all of the registered fingerprint data d_fpr of the subjects at the time of verification.

The memory 14 stores, for example, in more detail, as shown in FIG. 18, registered fingerprint data d_fprA1 of the forefinger of a subject A and position data dda1 at the time of the registration thereof in association, stores registered fingerprint data d_fprA2 of the forefinger of a subject A and position data ddA2 at the time of the registration thereof in association, stores registered fingerprint data d_fprA3 of the forefinger of a subject A and position data ddA3 at the time of the registration thereof in association, stores registered fingerprint data d_fprB1 of the forefinger of a subject B and position data ddb1 at the time of the registration thereof in association, . . . , and below, in the same way, stores the registered fingerprint data d_fpr of the finger of a subject and position data dd at the time of registration thereof in association. At this time, each of the position data dd indicates a different position.

FIG. 19 is a flow chart for explaining the operation of a third embodiment of an image verification system according to the present invention. By referring to FIGS. 18 and 19, an explanation will be given of the operation of the image verification system 1b centered on the operation of the CPU 17. Only. the differences from the first embodiment and the second embodiment will be explained.

Steps ST1 to ST3 are the same processings as those of the first embodiment, so the explanations will be omitted. At step ST21, the verification unit 173 makes the pattern matching unit 16 sequentially perform the pattern matching processing and the summation processing for the sensed fingerprint data d_fp and a plurality of registered fingerprint data d_fpr stored by the memory 14.

At step ST22, the verification processing result is stored in the memory 14. At step ST23, the position data generation unit 174 generates the position data dd of the newly sensed fingerprint data d_fp on the basis of the results of the pattern matching processing and the summation processing. The residual fingerprint judgment unit 172 compares the position data dd generated by the position data generation unit 174 and the registered data d_fpr stored by the memory 14 and stores the result of the comparison in the memory 14.

At step ST24, it is judged whether or not the number of times of verification is the number of times of registration of the fingerprint fp of the finger of a subject h. For example, in the present embodiment, for the subject A, as the fingerprint data is concerned, three registered fingerprint data d_fprA1 to d_fprA3 are stored as shown in FIG. 18. Therefore, it is judged whether or not the registered fingerprint data was verified three times for the subject A. When the number of times of verification is not the number of times of registration, the next registered fingerprint data is verified (ST25, step ST21).

On the other hand, when it is judged that the number of times of verification is the number of times of registration of the fingerprint fp of the finger of the subject h in the judgment of step ST24, it is judged whether or not the judgment of the verification of the fingerprint data d_fp is not a match in any of the number of times of registration (ST26). When it is not a match for any of the number of times of registration, the registered fingerprint data d_fpr of the next subject is verified (ST25, 21).

On the other hand, when the result of the judgment of verification is a match at least one time at step ST26, it is judged whether or not it is the same position data dd as the position data dd stored by the memory 14 (ST27). When there is the same position data dd, it is judged that the fingerprint data d_fp is residual fingerprint data, and the series of processings is terminated.

On the other hand, when there is no position data dd the same as the position data dd stored by the memory 14, it is judged that the fingerprint data d_fp is not residual fingerprint data.

Further, the residual fingerprint judgment unit 172 updates the position data dd linked with the fingerprint data d_fp for which the verification gave a match.

As explained above, in the present embodiment, for every subject, a plurality of registered fingerprint data d_fpr and position data dd linked with them are stored in the memory 14 and, at the time of verification, the newly sensed fingerprint data d_fp and all of the registered fingerprint data d_fpr for every subject stored by the memory 14 are verified and the position data dd compared, so even when a plurality of fingerprint data are registered in the memory 14 for every subject, a fingerprint can be verified with a high precision without erroneously detecting a residual fingerprint.

Further, where registering a plurality of fingerprints for one finger, registration of fingerprint data d_fp at the same position can be prevented. This is because, by registering the fingerprint data d_fp at different positions, the permissible range of the position offset at the time of verification can be made larger. Further, when the fingerprint sensor unit 11 is small in size, the verification is carried out on the basis of the registered data at different positions, therefore the verification can be carried out with a high precision.

Note that the present invention is not limited to the present embodiment. Various preferred modifications are possible. In the present embodiment, for example, an electrostatic capacitance type fingerprint sensor was explained as the fingerprint sensor unit, but the fingerprint sensor unit is not limited to this format. For example, the fingerprint sensor unit may also be a pressure type fingerprint sensor for detecting a fingerprint on the basis of the pressure by the finger of the subject or a thermal type fingerprint sensor for detecting a fingerprint on the basis of the heat of the finger of the subject.

Further, it is also possible to store history data of the position data dd in the memory for every verification and perform the verification on the basis of the history data. For example, when the position of placement of the finger of the subject differs from the usual position on the basis of the history data, it is also possible to perform the verification considering the reliability of the fingerprint data d_fp sensed at that time to be low.

Summarizing the effects of the invention, according to the present invention, an image verification system and image verification method able to verify a fingerprint with a high precision without erroneously detecting a residual fingerprint can be provided.

While the invention has been described with reference to specific embodiments chosen for purpose of illustration, it should be apparent that numerous modifications could be made thereto by those skilled in the art without departing from the basic concept and scope of the invention.

What is claimed is:

1. An image verification method comprising:
   sensing a first fingerprint using a fingerprint sensing means;
   storing image data of the first fingerprint sensed by the fingerprint sensing means as a first image data using an image data storing means;
   comparing a second image data of a second fingerprint sensed by the fingerprint sensing means with the first image data using a residual fingerprint judging means, wherein the fingerprint judging means judges whether the second image data is a residual fingerprint; and
   verifying the second image data image data using a verification means, when the residual fingerprint judging means judges that the second image data is not a residual fingerprint;
   wherein the residual fingerprint judging means judges that the second fingerprint is a residual fingerprint when the first image data and said second image data match, and judges that the second fingerprint is not a residual fingerprint when said first image data and said second image data do not match, and
   wherein the residual fingerprint judging means performs the steps comprising
      extracting a part of the second image data as a verification data;
      dividing the verification data into a plurality of blocks of predetermined sizes,
      producing a plurality of verification results, each verification result corresponding to a block from the plurality of blocks, and comprising points indicating locations relative to the first image data that match the corresponding block according to a pattern matching process,
      superimposing the plurality of verification results by moving each verification result based on the positional relationship of the corresponding block relative to the plurality of blocks, and
      judging whether or not the fingerprint is a residual fingerprint based on the degree of the overlap of the points in the verification results.

2. The image verification method for verifying fingerprint image data, comprising:
   sensing a first fingerprint using a fingerprint sensing means;
   generating position data for the first fingerprint based on a first image data using a position data generating means;
   storing the position data generated by said position data generating means as first position data using a storing means; and
   comparing a second position data, based on a second image data of a second fingerprint, sensed by said fingerprint sensing means, and the first position data; and
   judging whether or not second image data indicates the second fingerprint is a residual fingerprint using a residual fingerprint judging means,
   wherein said storing means stores and associates the first image data and the first position data at the time of verification of the first fingerprint; and
   wherein said residual fingerprint judging means compares the second position data and the first position data and judges whether or not the second image data indicates the second fingerprint is a residual fingerprint when the second image data and the first image data match as a result of a matching process; and
   wherein the residual fingerprint judging means performs the steps comprising:
      extracting a part of the second position data as a verification data,
      dividing the verification data into a plurality of blocks of predetermined sizes,
      producing a plurality of verification results, each verification result corresponding to a block from the plurality of blocks and comprising points indicating locations relative to the first position data that match the corresponding block according to a pattern matching process,
      superimposing the plurality of verification results by moving each verification result relative to the positional relationship of the corresponding block, and
      judging whether or not the fingerprint is a residual fingerprint in accordance with the degree of the overlap of the points in the plurality of verification results.

3. An image verification method comprising the steps of:
   storing image data obtained by sensing a first fingerprint as a first image data;
   comparing a second image data of a second fingerprint and the first image data to judge whether or not the second image data indicates that the second fingerprint is a residual fingerprint; and
   verifying the second image data based on the result of the comparing step,
   wherein the comparing step comprises the steps of:
      extracting a part of the second image data as a verification data,
      dividing the verification data into a plurality of blocks of a predetermined sizes,
      producing a plurality of verification results, each verification result corresponding to a block from the plurality of blocks and comprising points indicating locations relative to the first image data that match the corresponding block according to a pattern matching process,
      superimposing the plurality of verification results by moving each verification result relative to the positional relationship of the corresponding block, and
      judging whether or not the second fingerprint is a residual fingerprint based on the degree of the overlap of the points in the verification results.

4. An image verification method as set forth in claim 3 wherein:
   when said first image data and said second image data match, it is judged that the second image data is image data indicating a residual fingerprint, and said second image data is not verified, and
   when said first image data and said second image data do not match, it is judged that said second image data is not image data indicating a residual fingerprint, and said second image data is verified.

5. An image verification method for verifying fingerprint image data comprising the steps of:
   generating position data for a first fingerprint using image data obtained by sensing the first fingerprint;
   storing said generated position data as first position data; and
   comparing a second position data, corresponding to a second image data of a second fingerprint, and the first position data and judging whether or not said second image data indicates that the second fingerprint is a residual fingerprint, wherein the comparing step comprises the steps of:
extracting a part of the second position data as a verification data,
dividing the verification data to a plurality of blocks of predetermined sizes,
producing a plurality of verification results, each verification result corresponding to a block from the plurality of blocks and comprising points indicating locations relative to the first image that match the corresponding block according to a pattern matching process,
superimposing the plurality of verification results by moving each verification result relative to the positional relationship of the corresponding block, and
judging whether or not the second fingerprint is a residual fingerprint based on the degree of overlap of points in the plurality of the verification results.

6. An image verification method as set forth in claim 5, wherein:
the image data of the fingerprint and the first position data at the time of the verification of the fingerprint are stored in association.

7. The image verification method as set forth in claim 1, wherein, for each verification result and corresponding block, the pattern matching process determines the portions of the first image that are similar to the corresponding block by
comparing the corresponding block and a plurality of portions of the first image data, and
determining the points on the first image data that are similar to the corresponding block,
storing the points in the verification results;
wherein the corresponding block is similar to a part of the first image if an exclusive OR operation on each of the cells of the corresponding block and the part of the first image indicates that a minimum number of cells are identical.

8. The image verification method as set forth in claim 1, wherein the superimposing step moves each of the verification results by a distance necessary to cause the corresponding blocks to overlap.

9. The image verification method as set forth in claim 1, wherein degree of the overlap of the points is determined by the number of points from different verification results that overlap a region defined by a threshold value.

10. The image verification method as set forth in claim 2, wherein, for each verification result and corresponding block, the pattern matching process determines the portions of the first image that are similar to the corresponding block by
comparing the corresponding block and a plurality of portions of the first image data, and
determining the points on the first image data that are similar to the corresponding block,
storing the points in the verification results;
wherein the corresponding block is similar to a part of the first image if an exclusive OR operation on each of the cell of the corresponding block and a part of the first image indicates that a minimum number of cells are identical.

11. The image verification method as set forth in claim 2, wherein the superimposing step moves each of the verification results by a distance necessary to cause the corresponding blocks to overlap.

12. The image verification method as set forth in claim 2, wherein degree of the overlap of the points is determined by the number of points from different verification results that overlap a region defined by a threshold value.

13. The image verification method as set forth in claim 3, wherein, for each verification result and corresponding block, the pattern matching process determines the portions of the first image that are similar to the corresponding block by
comparing the corresponding block and a plurality of portions of the first image data, and
determining the points on the first image data that are similar to the corresponding block,
storing the points in the verification results;
wherein the corresponding block is similar to a part of the first image if an exclusive OR operation on each of the cell of the corresponding block and the part of the first image indicates that a minimum number of cells are identical.

14. The image verification method as set forth in claim 3, wherein the superimposing step moves each of the verification results by a distance necessary to cause the corresponding blocks to overlap.

15. The image verification method as set forth in claim 3, wherein degree of the overlap of the points is determined by the number of points from different verification results that overlap a region defined by a threshold value.

16. The image verification method as set forth in claim 5, wherein, for each verification result and corresponding block, the pattern matching process determines the portions of the first position data that are similar to the corresponding block by
comparing the corresponding block and a plurality of portions of the first position data, and
determining the points in the first position data that are similar to the corresponding block,
storing the points in the verification results;
wherein the corresponding block is similar to a part of the first position data if an exclusive OR operation on each of the cell of the corresponding block and the part of the first position data indicates that a minimum number of cells are identical.

17. The image verification method as set forth in claim 5, wherein the superimposing step moves each of the verification results by a distance necessary to cause the corresponding blocks to overlap.

18. The image verification method as set forth in claim 5, wherein degree of the overlap of the points is determined by the number of points from different verification results that overlap a region defined by a threshold value.

* * * * *